Jan. 25, 1966   J. H. ANDERSON ETAL   3,231,235
BALL VALVE
Original Filed June 29, 1962
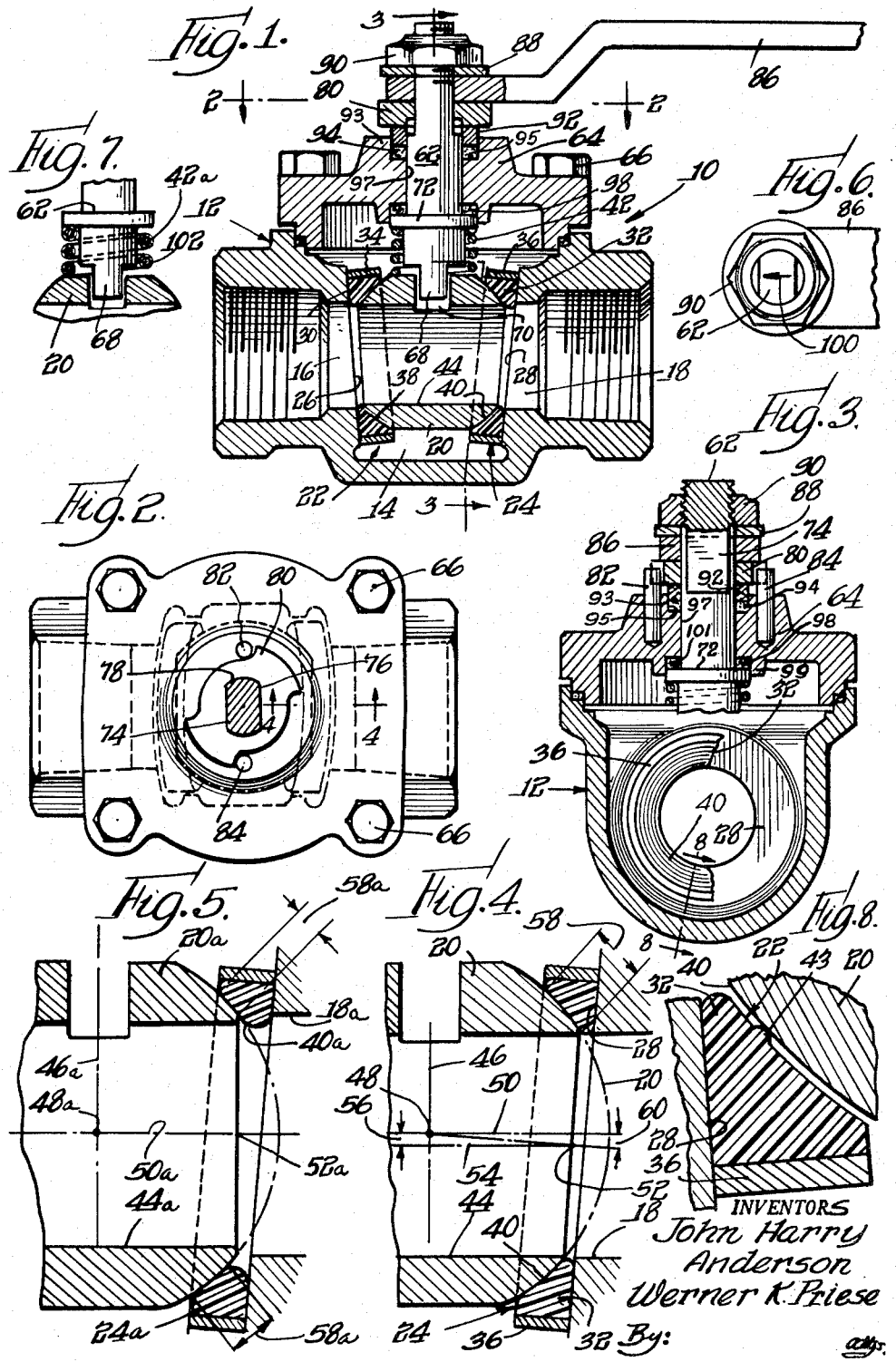
INVENTORS
John Harry Anderson
Werner K. Priese
By:

United States Patent Office 3,231,235
Patented Jan. 25, 1966

---

3,231,235
BALL VALVE
John Harry Anderson, Burlington, Wis., and Werner K. Priese, Barrington, Ill., assignors to Hills-McCanna Company, Carpentersville, Ill., a corporation of Illinois
Application June 29, 1962, Ser. No. 206,512, now Patent No. 3,168,279, dated Feb. 2, 1965, which is a continuation of abandoned application Ser. No. 830,873, July 31, 1956. Divided and this application Feb. 14, 1963, Ser. No. 258,594
4 Claims. (Cl. 251—214)

The present invention relates to ball valves. This application is a division of copending application Serial No. 206,512, filed June 29, 1962, and now Patent No. 3,168,- 279, which copending application Serial No. 206,512 was a continuation of application Serial No. 830,873, filed July 31, 1959, and now abandoned.

One object of the invention is to provide a ball valve having a new and improved construction which affords a number of worthwhile advantages, particularly in sealing the valve against the escape of fluid along the valve operating stem.

Other objects and advantages of the invention will become apparent from the following description of the exemplary embodiment illustrated in the drawings, in which:

FIGURE 1 is a longitudinal sectional view of a ball valve embodying the invention;

FIG. 2 is a plan view taken along the line 2—2 of FIG. 1;

FIG. 3 is a transverse sectional view taken generally along the irregular line 3—3 of FIG. 1;

FIG. 4 is a fragmentary sectional view on an enlarged scale taken along the line 4—4 of FIG. 2 and showing the valve ball in open position and in engagement with one coacting valve seat, and illustrating in phantom the relationship of the ball to the valve seat when the valve is closed;

FIG. 5 is a view similar to FIG. 4 which illustrates by way of contrast the relationship which would prevail between the valve ball and the valve seats except for a structural feature incorporated in the valve embodying the invention and illustrated in FIGS. 1 to 4;

FIG. 6 is a fragmentary top view of the valve;

FIG. 7 is a fragmentary detail view showing the valve spring encased in a corrosion resistant covering; and FIG. 8 is an enlarged fragmentary sectional view taken along the line 8—8 of FIG. 3.

Referring to the drawings in greater detail, the ball valve 10 forming the exemplary embodiment of the invention illustrated comprises valve body or housing means 12, FIG. 1, defining an internal valve chamber 14 and two passages 16, 18 opening into opposite sides of the chamber in opposed alignment with each other. As shown, the outer ends of the passages 16, 18 are counterbored and internally threaded for connection with coacting pipes or other conduits (not shown) to be connected by the valve.

A rotatable valve ball 20 having a basically spherical shape is disposed in the chamber 14 between the inner ends of the passages 16, 18, as shown. Opposite sides of the ball valve 20 are engaged by a pair of annular valve seats 22, 24 encircling the inner ends of the respective passages 16, 18.

The two annular seats 22, 24 are slidably supported on two flat support surfaces 26, 28 formed on the body means 12 in encircling, generally transverse relation to the inner ends of the respective passages 16, 18 and converging somewhat in relation to each other in a lateral direction with respect to the passages 16, 18.

The annular valve seats 22, 24 are formed of annular rings 30, 32 of Teflon and are confined against radial expansion by annular bands of metal 34, 36 closely encircling the Teflon rings and forming component elements of the valve seats.

The inner peripheries of the rings 30, 32 are shaped to form, respectively, annular sealing surfaces 38, 40 extending substantially the full axial width of the rings and shaped to conform to and fit against the external spherical surface of the valve ball 20.

A helical compression spring 42 is mounted in the valve to engage the ball 20 to urge the ball 20 and seats 22, 24 in the direction in which the support surfaces 26, 28 converge.

The Teflon ring 32 of the valve seat 22, which is identical to the valve seat ring 24, is machined to define on a medial annular segment of the ball opposing surface 40 a circular initial sealing bead 43 protruding only a few thousandths of an inch above the surface 40 and having a shape in transverse section, FIG. 8, conforming to a segment of a circle having a small radius of curvature.

Upon assembly of the valve 10, the crest of the bead 43 on each valve seat surface engages the opposing ball 20 to effect "line" contact of the value seat with the ball so that the valve described becomes immediately effective upon being assembled to produce vacuum or bubble tight engagements of both seats 22, 24 with the valve ball.

As shown in FIGS. 1, 3 and 4, the valve ball 20 defines an internal bore 44 extending through the ball and oriented in relation to the ball so that opposite ends of the bore are moved into and out of registration with the central openings through the respective valve seats 22, 24 as an incident to the turning of the ball between its open and closed positions.

In the improved valve illustrated, the internal bore 44 is oriented in relation to the valve ball 20 so that the centers of opposite ends of the bore are displaced toward the converging ends of the valve seat support surfaces 26, 28 away from a plane extending through the center of the ball in perpendicular relation to the linear direction in which the surfaces 26, 28 converge toward each other.

Having reference to FIG. 4, the rotary axis of the ball 20 is designated by the number 46.

A plane extending through the center 48 of the ball 20 in perpendicular relation to the rotary axis of the ball is represented in FIG. 4 by the line 50. The center of one end of the bore 44 is designated in FIG. 4 by the number 52 and a line extending between the centers of opposite ends of the bore is designated by the number 54. The center of the end of the bore 44 opposite from that specifically illustrated in FIG. 4 is similarly offset from the plane 50 as indicated in FIG. 4 by the parallel relationship of the plane 50 to the line 54 extending between the centers of opposite ends of the bore. The actual displacement of opposite ends of the internal bore 44 from the plane 50 is designated in FIG. 4 by the number 56.

Offsetting of the centers of opposite ends of the bore 44 from the plane 50 toward the converging ends of the surfaces 26, 28 provides a substantially concentric alignment of opposite ends of the bore with the central openings through the respective valve seats 22, 24, as shown in FIGS. 1 and 4, when the ball 20 is in open position. The width of the area of mutual contact between the ball engaging surface 40 of the valve seat 24, for example, and the ball 20, when the latter is in open position, is designated in FIG. 4 by the number 58. Because of the concentric relationship produced between the seats 22, 24 and opposite ends of bore 44 by virtue of the offset positions of opposite ends of the bore from the plane 50, the width 58 of the area of effective engagement of the seat 24, for example, with the ball when the latter is in open position is circumferentially uniform around the valve seat.

As shown in FIG. 4, the offsetting of the bore ends is such that a line drawn from the center 48 of the valve ball through the center 52 of one end of the bore 44 makes an angle 60 with the plane 50 which is equal to the inclination of the surface 28 relative to the line 46, such inclination being equal to one-half the angular divergence of the two support surfaces 26, 28.

In FIG. 5 structural components corresponding to those shown in FIG. 4 previously described are designated with the same reference numerals with the addition of the suffix "a". The valve structure illustrated in FIG. 5 differs from that shown in FIG. 4 only in that the straight cylindrical valve bore 44a is concentric with the center 48a of the valve ball 20a and the centers of opposite ends of the bore 44a lie in the plane 50a extending through the center 48a of the ball in perpendicular relation to the linear direction 46a in which the valve seat support surfaces converge.

The construction of FIG. 5 produces asymmetrical engagement of the valve seat 24a, for example, with the ball 20a when the valve is open as shown in FIG. 5, and as a result the width of the ball opposing surface 40a of the valve seat 24a in active engagement with the ball 20a varies from a maximum width at the lower side of the seat, with reference to FIG. 5 to a greatly reduced width at the diametrically opposite side of the seat.

The ball 20 in the improved valve 10, FIGS. 1 to 4 is turned between its open and closed positions as described by means of a rotary valve stem 62 mounted in a removable cover 64 forming a part of the valve body means 12. The cover 64 is removably secured by cap screws 66 to the main portion of the body means 12 to cover the side of the valve chamber 14 toward which the valve seat support surfaces 26, 28 diverge from each other. Hence, removal of the cover 64 provides direct and unrestricted access to the chamber 14 for inspecting and servicing the valve ball and valve seats.

The inner end of the valve stem 62 protrudes inwardly from the cap 64 and defines a generally flat tang 68 which projects into a slot 70 in the ball 20 to transmit rotary motion from the stem to the ball. The previously mentioned helical spring 42 encircles the inner end of the stem 62 between the ball 20 and an annular shoulder 72 on the stem as shown in FIG. 1.

The opposite end of the stem 62 projects outwardly from the cover 64 and is milled on opposite sides to form two parallel flats 74, 76, FIGS. 2 and 3. The flatted end of the stem 62 extends through an elongated slot 78 in an elongated, transverse throw plate 80 which projects a substantial distance beyond opposite sides of the stem as shown in FIGURE 2. A pair of limit stop pins 82, 84 are fixed into the cover 64 as shown in FIG. 3 to project outwardly into interfering relation to opposite ends of the throw plate 80, FIG. 2, to limit rotation of the throw plate and stem 62 to a radial angle of approximately 90 degrees, stopping rotary movement of the stem 62 in positions corresponding to the open and closed positions of the valve ball 20.

The slotted inner end of a radial operating handle 86 is fitted on the projecting end of the stem 62 in overlying relation to the throw plate 80 and covered by a washer 88 which is engaged by a nut 90 threaded onto the extreme end of the stem as shown in FIGURES 1 and 2.

A short cylindrical gland 92 encircles the stem 62 between the cover 64 and packing 94 fitted into the top of the cover 64 around the stem. As shown in FIGS. 1 and 3, the packing 94 is fitted into the cover 64 in closely encircling relation to the stem 62 and is, itself, closely encircled by an annular shoulder 93 on the cover. In this manner the packing 94 fits down into and rests against the bottom of an outwardly opening annular well 95 produced in the cover 64 between the shoulder 93 and the stem 62 by an outer counterbore (also denoted by the number 95) in the outer end of the cover bore 97, which receives and journals the stem 62. Packing 98 is fitted around the inner end of the stem 62 between the collar 72 and the cover 64. Also, as shown in FIG. 1 and as indicated by reference numbers in FIG. 3, the packing 98 is fitted into the cover 64 in closely encircling relation to the stem 62 and is, itself, closely encircled by an annular shoulder 99 on the cover. In the manner illustrated, the packing 98 fits up into and rests against the bottom of an inwardly opening annular well 101 produced in the cover 64 between the shoulder 99 and the stem 62 by an inner counterbore (also denoted by the number 101) in the inner end of the stem journalling cover bore 97.

This structural arrangement provides for simultaneous tightening of the two packings 94, 98, encircling the inner and outer ends of the stem, as an incident to tightening of the single nut 90 which urges the stem shoulder 72 and the gland 92 toward each other to exert compressive forces on the packings. The action of the single nut 90 in tightening the inner packing 98 as well as the outer packing 94 is of decided advantage in maintaining the fluid tight integrity of the valve.

Proper operation of the valve even by unskilled personnel is facilitated by means of a red indicating arrow 100 conspicuously displayed on the outer end of the stem 62 and oriented in relation to the stem to have a parallel alignment with the two passages 16, 18 when the valve is open and to point laterally at a right angle to the passages 16, 18 when the valve is closed.

The spring 42 located within the valve housing 12 can be protected from contact with the fluid in the housing by encasing the spring in a material resistant to the chemical action of the fluid. FIG. 7 shows a sectional view of a spring 42a used in this environment and encased in an impervious covering 102 of Teflon, which is immune to attack by most fluids.

It will be appreciated that the invention is not necessarily limited to the specific embodiment illustrated but includes variants and structural alternatives within the spirit and scope of the invention as defined by the claims.

The invention is claimed as follows:

1. A ball valve comprising, in combination, body means including a detachable cover and defining a valve chamber and two passages extending thereinto, a valve ball rotatably disposed within said chamber, valve seats extending around the inner ends of said respective passages and sealing against said valve ball, a valve stem extending rotatably through said cover into said chamber and being drivingly connected to said ball, said stem being movable axially with respect to said cover, said cover including means encircling said stem at the inner side of the cover and being shaped to define a first annular seal well encircling the stem immediately adjacent thereto and opening axially inward, a first yieldable seal of annular form disposed in said first well in encircling relation to said stem, a generally circular seal compressor supported on said stem inwardly of said first seal and being shaped to extend axially into said well in confronting relation to said first seal to apply axial force thereto, said cover including means encircling said stem at the outer side of the cover and defining a second seal well opening axially outward in encircling immediately adjacent relation to said stem, a second yieldable seal of annular form disposed in said second seal well in encircling relation to said stem, a seal compressing gland element encircling said stem outwardly of said second seal and being shaped to extend axially into said second well to apply inward compressing force to said second seal, said gland element being axially movable on said stem, a handle non-rotatably mounted on said stem outwardly of said gland element, said handle being axially movable on said stem and having an axial force transmitting relation to said gland element, and retaining means on the outer end of said stem coacting with said handle to urge the latter inwardly with respect to said stem to transmit an inward axial force through said handle and said gland element to said second seal and to transmit an outward axial force through said stem and said seal compressor to said first seal to effect simultaneous tightening of both said first and second seals.

2. A valve comprising, in combination, body means defining a valve chamber and two passages extending thereinto a valve ball rotatably disposed within said chamber, valve seats extending around the inner ends of said respective passages and sealing against said valve ball, a valve stem extending rotatably through said body means into said chamber and being drivingly connected to said ball, said stem being movable axially with respect to said body means, said body means including means encircling said stem adjacent said chamber and defining with the stem a first annular seal well encircling the stem in adjacent relation thereto and opening axially inward, an inner yieldable seal of annular form disposed in said first well in encircling relation to said stem, a seal compressor supported on said stem inwardly of said inner seal and being shaped to extend axially into said well in confronting relation to said inner seal to apply axial force thereto, said body means including means encircling said stem to define therewith a second annular seal well opening axially outward in encircling immediately adjacent relation to said stem, an outer yieldable seal of annular form disposed in said second well in encircling relation to said stem, a compressing gland element encircling said stem outwardly of said outer seal and being shaped to extend axially into said second well to apply inward compressing force to said outer seal, said gland element being axially movable on said stem, tightening means on the outer end of said stem reacting on said gland element and coacting with said stem to force the stem outwardly with respect to the gland element to transmit an outward seal tightening axial force through said stem and said seal compressor to said inner seal and to apply an inward seal tightening axial force through said gland element to said outer seal.

3. A valve comprising in combination, body means defining a valve chamber and two passages extending into said chamber, a rotatable valve ball disposed within said chamber, valve seat means extending around the inner end of each of said passages and forming a seal between said body means and said ball, a valve stem extending inwardly through said body means and having an inner end drivingly connected to said ball, said stem being movable axially with respect to said body means, said body means defining an inner surface closely encircling said stem on the valve chamber side of said body means, a first yieldable annular seal encircling said stem on the valve chamber side of said body means and in adjacent relation to said inner surface, a seal compressor supported on said stem inwardly of said seal and confronting said seal to apply axial force to the latter to compress the seal between the seal compressor and the portion of the body means defining said inner surface encircling the stem, means encircling said yieldable annular seal to confine the seal to a predetermined maximum diameter when it is subjected to compression between said seal compressor and said body means, said body means defining an outer surface closely encircling said stem, a second yieldable annular seal encircling said stem on the external side of said body means in adjacent relation to said outer surface on said body means, a gland element encircling said stem outwardly of said second seal in adjacent opposing relation to the latter and being axially movable on said stem, means encircling said second yieldable annular seal to confine the second seal to a predetermined maximum diameter when the second seal is subjected to compression between said gland element and said body means, means for rotating said stem to turn said valve ball between valve open and valve closed positions thereof, and means coacting with said stem and said gland element to react therebetween to apply an inward axial force through said gland element to said second annular seal to tighten the latter around the stem and to apply an outward axial force through said stem and said seal compressor to said first annular seal to tighten the latter around the stem.

4. A valve comprising in combination, body means defining a valve chamber and two passages extending into said chamber, a rotatable valve ball disposed within said chamber to control communication between said passages, valve seat elements extending around the inner ends of said respective passages and sealing against said ball, a valve stem extending inwardly through said body means and having an inner end drivingly connected to said ball, said stem being movable axially with respect to said body means, a first yieldable annular seal encircling said stem on the valve chamber side of the portion of said body means through which the stem extends, a seal compressor supported on said stem inwardly of said seal and confronting said seal to apply axial force to the latter to compress the seal between the seal compressor and said portion of the body means encircling the stem, means encircling said yieldable annular seal to confine the seal to a predetermined maximum diameter when it is subjected to compression between said seal compressor and said body means, means forming a second annular seal encircling said stem on the external side of said body means in adjacent relation to said body means, a seal pressure applying element encircling said stem outwardly of said second seal in adjacent opposing relation to the latter and being axially movable on said stem, means for rotating said stem to turn said valve ball between valve open and valve closed positions thereof, and means coacting with said stem and said seal pressure applying element to react therebetween to apply an inward axial force through said pressure element to said second seal to tighten the latter and to apply an outward axial force through said stem and said seal compressor to said first annular seal to tighten the latter.

References Cited by the Examiner

UNITED STATES PATENTS

| 1,784,381 | 12/1930 | O'Stroske | 251—315 X |
| 1,891,706 | 12/1932 | De Ram | 277—61 |
| 2,895,710 | 7/1959 | Sanctuary | 215—312 |
| 2,981,284 | 4/1961 | Putnam | 251—214 X |
| 3,047,007 | 7/1962 | Lunken | 251—315 X |

FOREIGN PATENTS

| 1,005,332 | 3/1957 | Germany. |
| 14,025 | 1/1912 | Great Britain. |

ISADOR WEIL, *Primary Examiner.*

D. A. ROWE, *Assistant Examiner.*